Dec. 7, 1965
R. E. WIDDOWSON
3,221,763
PILOT OPERATED FLOW CONTROL VALVE
Filed Jan. 23, 1964
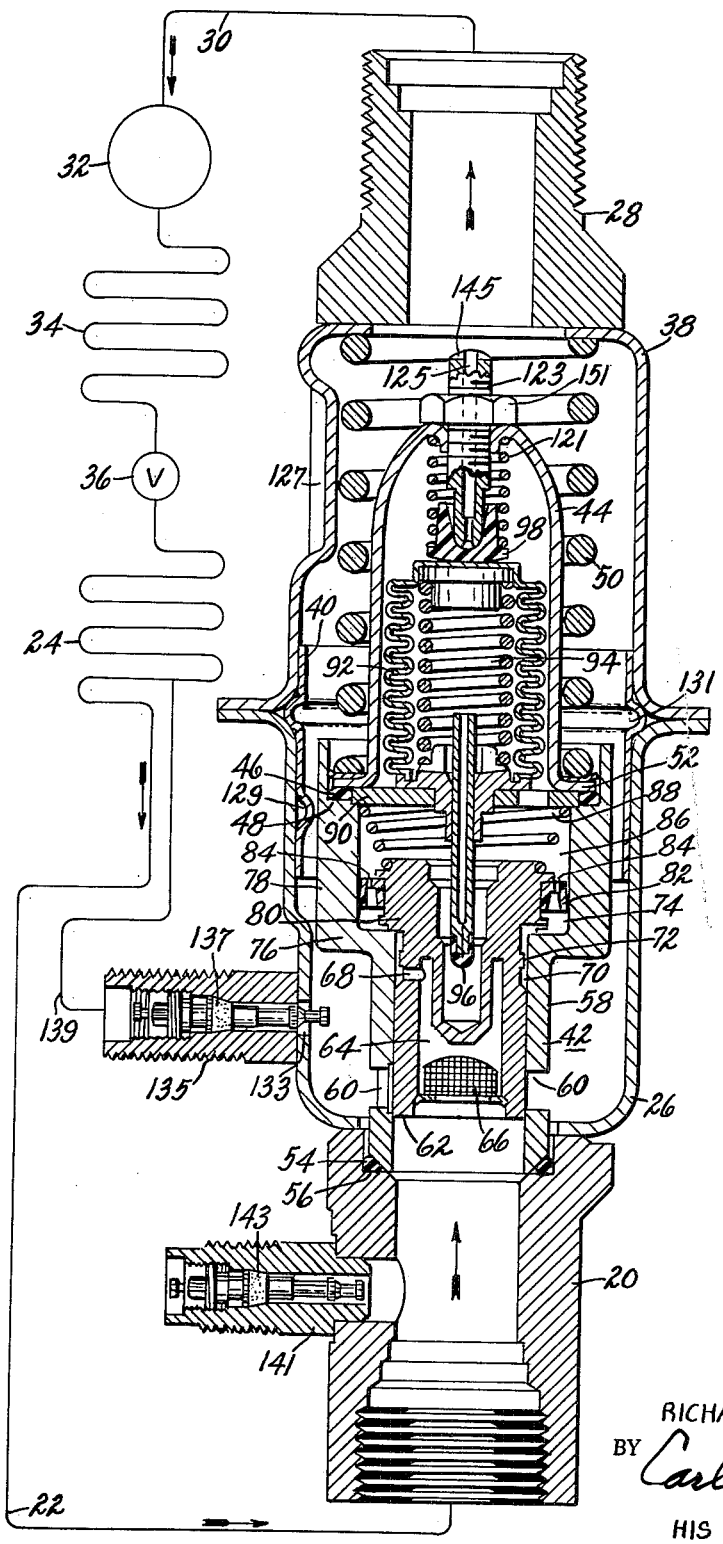
INVENTOR.
RICHARD E. WIDDOWSON
BY *Carl A. Stickel*
HIS ATTORNEY United States Patent Office 3,221,763
Patented Dec. 7, 1965

3,221,763
PILOT OPERATED FLOW CONTROL VALVE
Richard E. Widdowson, Dayton, Ohio, assignor to General Motors Corporation, Detroit, Mich., a corporation of Delaware
Filed Jan. 23, 1964, Ser. No. 339,714
7 Claims. (Cl. 137—220)

This invention pertains to refrigerating apparatus and more particularly to flow control valves such as may be used to maintain a substantially constant pressure in an evaporator or other fluid containers.

In automotive air conditioners, to make the greatest possible use of the compact evaporator, it is necessary to operate the evaporator at the coldest temperatures attainable without frosting. To accomplish this suction line valves are used. Some of these are affected by changes in altitude so that it is necessary to provide manual or automatic adjustments for correcting for altitude. Some of these valves also have been bulky and expensive and did not keep the temperature sufficiently low while others permitted the evaporator to frost.

It is another object of this invention to provide an inexpensive flow control device which will not be affected by changes in altitude or barometric pressure which can be adjusted to closely maintain the pressure and temperature desired and which is simple, reliable and easy to manufacture.

It is another object of this invention to provide a flow control valve with an inexpensive dash pot arrangement for preventing hunting and vibration.

It is another object of this invention to provide a flow control valve with a straight through flow which is small in external dimensions and has a minimum of projections and is easy to assemble.

These and other objects are attained in the form shown in the drawing in which an outer enclosure is formed of a screw machine made inlet and outlet at the opposite ends between which are two sheet metal cup shaped members, all of which are bonded together to form the valve body. A double cylinder and double piston valve arrangement is held by a spring in sealing engagement with the inlet. An evacuated bellows controls the flow of fluid leaking by the double piston arrangement so as to control the opening movement of the piston valve to control the flow through the inlet in accordance with the inlet or evaporator pressure. The dash pot chamber is formed between the two pistons to damp the movement of the piston valve.

Further objects and advantages of the present invention will be apparent from the following description, reference being had to the accompanying drawings wherein preferred embodiments of the present invention are clearly shown.

In the drawing, the figure is a sectional view of a flow control device embodying one form of my invention together with the remaining elements of a refrigerating system illustrated diagrammatically.

Referring now to the drawing, there is shown an inlet fitting 20 of steel made by a screw machine connected by the suction conduit 22 to an evaporator 24. This fitting 20 is bonded by welding to the flanged cup shaped member 26 of sheet steel. At the opposite end the outlet fitting 28 also of steel and made by a screw machine is connected by the second portion of the suction conduit 30 which connects to the inlet of a sealed motor compressor unit 32. This motor compressor unit 32 delivers compressed refrigerant to the condenser 34 from which liquefied refrigerant flows under the control of the liquid flow control valve or device 36 to the evaporator 24. The outlet fitting 28 is bonded and sealed by welding to the inverted sheet steel cup member 38 having its flange bonded by welding to the adjacent flange of the cup shaped member 26 with a sealed connection. An inner thin sheet steel sleeve 40 insures the alignment of the two cup shaped members 26 and 38. This sleeve 40 also blocks any weld flash which may occur when the two adjacent flanges of the two clip shaped members 26 and 38 are electrically welded together. Within the valve body and coaxially aligned with the fittings 20 and 28 and the cup shaped members 26 and 38 is a first inner enclosure formed of the double cylinder member 42 and the inner inverted cup shaped member 44 having its lower flange resting in sealed engagement with the O ring 46 which in turn rests upon the inner flange 48 at the top of the double cylinder member 42. The first inner enclosure is held in place by a compression type coil spring 50 having its upper end supported upon the in-turned flange at the top of the upper cup shaped member 38 and its lower end supported on a thin locking retainer bearing on the out-turned flange 52 of the inverted cup shaped member 44 which bears upon the O ring 46. The force of the spring 50 is transmitted through the flange 48 and the double cylinder member 42 to the O ring 54 seated upon the flange 56 in the inlet fitting 20. By this arrangement the spring 50 holds the first enclosure formed of the inverted cup shaped member 44 and the double cylinder member 42 in place and also in sealing engagement with the inlet fitting 20.

The small cylindrical portion 58 of the member 42 is provided with slots 60 providing communication between the inlet fitting 20 and the outlet fitting 28 through the interior of the valve body around the first inner enclosure composed of the inverted cup member 44 in the double cylinder member 42. Within the smaller cylinder 58 is a piston valve 62 which is adapted by downward movement to wholly or partially close the ports 60 to control the flow of fluid from the inlet fitting 20 to the outlet fitting 28. This piston valve 62 has a hollow interior chamber 64 provided at the entrance with a screen 66 and having adjacent its upper portion a small radially extending passage 68 extending from the inner chamber 64 to an external groove 70 which communicates through a restricted clearance space of .001 to .004 of an inch between the rim 72 and the cylinder wall 58 with the dash pot chamber 74.

This dash pot chamber 74 is provided above the shoulder 76 between the lower smaller cylinder 58 and the upper larger cylinder 78 of the double cylinder 42. A larger upper piston 80 is provided for the upper larger cylinder 78 and has a piston ring 82 U-shaped in cross-section formed of a suitable plastic such as acetal resin bearing against and combining with the cylinder wall of the upper larger cylinder to complete the enclosure of the dash pot chamber 74. This piston ring 82 is provided with a plurality of orifices 84 which allow a restricted flow of fluid out of the dash pot chamber 74 into the upper cylinder chamber 86. This upper cylinder chamber contains the conical coil spring 88 bearing at its lower end upon an upper flange of the upper piston 80 and bearing at its upper end against the perforated plate 90 supported on the shoulder 48 inside the O ring 46.

The plate 90 is fastened to and bonded to the bottom of a metal bellows 92 containing a compression type coil spring 94. This bellow 92 is preferably completely evacuated through the charging tube 96. The bellows 92 is concentrically located within the inverted cup member 44 and its upper closed end supports a plastic valve member 98 having a frusto-spherical bottom surface held against the closed end of the bellows 92 by a light compression type coil spring 121 having its upper end supported by the inwardly turned upper flange of the inverted inner cup member 44 and its lower end supported by the flange of the valve member 98. Threaded through the upper coaxially threaded opening of the inverted cup member 44 is a screw 123 having a coaxial passage 125 extending from one end to the other and terminating in a restricted portion at the bottom within a hemispherical tip. This hemispherical tip normally engages a hemispherical seat within the central recess of the plastic valve member 98.

The upper cup shaped member 38 may have three indentations 127 for assuring a central location of the coil spring 50. The sleeve 40 is also provided with three or more indentations 129 for assuring a central location of the upper cylinder 78 within the valve body. The cup members 26 and 38 may be press fitted onto the ends of the sleeve 40 which is provided with an annular bead 131 for insuring its desired location relative to the members 26 and 38. The cup shaped member 26 is provided with an aperture 133 and a fitting 135 containing a tire valve 137. This fitting 135 is connected through the pipe 139 with the bottom of the evaporator 24 for drawing any liquid such as a mixture of refrigerant and lubricant which may collect in the bottom of the evaporator 24 under ceratin conditions of operation. This is made possible by the difference in pressure between the evaporator 24 and the interior of the valve body when the ports 60 are closed or nearly closed by the piston valve 62. The inlet fitting 20 may also be provided with a gage connection 141 likewise provided with a tire valve 143.

The aligned construction of all the parts makes this device relatively easy to manufacture and assemble. The screw 123 is provided with a screw driver slot 145 so that it may be readily adjusted through the outlet fitting 28 to maintain any desired pressure within the first enclosure provided by the double cylinder member 42 and the inverted cup member 44. Its interior location will prevent unauthorized adjustment since it is necessary to remove the suction conduit to adjust it. This adjustment determines the pressure at which the second enclosure constituting the bellows 92 will open and close the second valve formed by the valve member 98 and the bottom of the screw 123. A lock nut 151 is provided on the adjusting screw 123.

The difference in pressure between the bottom and top of the piston valve 62 and the force of the spring 88 controls the position of the piston valve 62 to control the opening of the ports 60. When the pressure in the inlet 20 is high, the piston valve 62 will be moved a greater amount upwardly to expose a greater area of the ports 60. Through the leakage path provided by the passage 68, the groove 70, the restricted passage surrounding the rim 72 and the orifices 84, the pressure within the inner cup member 44 will be responsive to the pressure within the inlet fitting 20. This pressure will exert its force upon the bellows 92. The deflection of the bellows 92 will depend upon the force of the springs 121 and 94 which act in opposition to each other. The opening pressure of the second valve means provided by the valve member 98 and the screw 123 will be determined by the adjustment of the screw 123. As the screw 123 is turned to move downwardly, the pressure will increase whereas when the screw 123 is turned in the opposite direction the opening pressure will decrease. This will determine the pressure maintained in the inlet fitting 20.

When the second valve means is closed, the piston valve 62 will tend to close while when the second valve means is open, the piston valve 62 will open. The opening of the piston valve 62 in general will be somewhat proportional to the opening of the second valve means. Since the bellows 92 is entirely within the valve body and particularly entirely within the first enclosure within the valve body, it is not exposed to atmospheric pressure and therefore will not be affected by changes in barometric pressure or changes in altitude. This makes is possible to set the valve so as to keep the pressure within the evaporator 24 sufficiently low to attain the coldest temperature possible without the accumulation of frost. This will vary with different refrigerants. For example, when difluorodichloromethane is used as a refrigerant the setting normally will be 30 p.s.i.g.

While the embodiments of the present invention as herein disclosed, constitutes a preferred form, it is to be understood that other forms might be adopted.

What is claimed is as follows:

1. A flow control device including a body having an inlet and an outlet, a first enclosure means within said valve body coaxially aligned with said inlet, a piston valve coaxially aligned with said inlet within said enclosure means and adapted to cooperate with said inlet to control the flow of fluid from said inlet to said outlet, a weak spring for urging said piston valve to closed position, said piston valve being exposed to the pressure at said inlet on one side and being exposed to the pressure within said first enclosure means on the opposite side, said first enclosure being provided with a restricted connection with said inlet and with outlet means communicating with said outlet, and second valve means cooperating with said outlet means for controlling flow out of said first enclosure means, and a second enclosure within and exposed to the pressure in said first enclosure means having a diaphragm means operably connected to said second valve means for controlling the pressure in said first enclosure means substantially independently of the pressure at said outlet to control said piston valve, said second enclosure being evacuated and sealed.

2. A flow control device including a body having an inlet and an outlet, a first enclosure means within said valve body coaxially aligned with said inlet, a piston valve coaxially aligned with said inlet within said enclosure means and adapted to cooperate with said inlet to control the flow of fluid from said inlet to said outlet, a weak spring for urging said piston valve to closed position, said piston valve being exposed to the pressure at said inlet on one side and being exposed to the pressure within said first enclosure means on the opposite side, said first enclosure being provided with a restricted connection with said inlet and with outlet means communicating with said outlet, second valve means cooperating with said outlet means for controlling flow out of said first enclosure means, and a second enclosure within and exposed to the pressure in said first enclosure means having a diaphragm means operably connected to said second valve means for controlling the pressure in said first enclosure means substantially independently of the pressure at said outlet to control said piston valve, said second enclosure being evacuated and sealed, said inlet and said outlet means and said diaphragm means and said second valve means being coaxially aligned with said inlet and said piston valve.

3. A flow control device including a body having an inlet and an outlet, a cylinder member located in said body between said inlet and said outlet, first annular seal between said body and one end portion of said cylinder member adjacent said inlet, the opposite end of said cylinder member being provided with a second annular seal, an inverted cup-shaped member having an out turned flange pressing said second seal against said opposite end of said cylinder member, a spring surrounding said inverted cup-shaped member having one end pressing against said out turned flange to hold said flange against said second annular seal, said body having means for supporting the opposite end of said spring, said cylinder member being provided with a port, a piston slidably mounted in said cylinder member cooperating with said port, and means for controlling said piston.

4. A flow control device including a body having an inlet and an outlet, a cylinder member within said body between said inlet and said outlet, a first annular seal located between one end of said cylinder member and said body adjacent said inlet, said cylinder member being provided with a port, a piston within said cylinder member adapted to cover said port, said cylinder member being provided with a shoulder upon its opposite end, a support mounted upon said shoulder, a second annular seal surrounding said support and resting on said shoulder outside of said support, first spring means extending between said support and said piston, an inverted cup-shaped member having an out turned flange resting upon said support and said second annular seal, a second spring means surrounding said inverted cup-shaped member having one end pressing upon said out turned flange, said body having means for supporting the opposite end of said second spring means.

5. A flow control device as specified in claim 4 in which a second enclosure provided with a diaphragm means is mounted upon said support, said second enclosure being evacuated and sealed, said inverted cup-shaped member being provided with an outlet, and valve means controlled by said second diaphragm means for controlling the flow of fluid through the outlet of said inverted cup-shape member.

6. A flow control device including an inlet member and an outlet member, a first sleeve having an in turned flange bonded to said inlet member and having an out turned flange at the opposite end, a second sleeve having an in turned flange bonded to said outlet member and having an out turned flange bonded to the out turned flange of said first sleeve, a cylinder member within said first sleeve, an annular seal between said cylinder member and said inlet member, a spring within said second sleeve having one end pressing against said cylinder member to force said seal against said inlet member and having the opposite end pressing against the in turned flange of said second sleeve, and means for controlling the flow of fluid through said cylinder member.

7. A flow controlling device including an inlet member and an outlet member, a first sleeve having an in turned flange bonded to said inlet member and having an out turned flange, a second sleeve having an in turned flange bonded to said outlet member and having an out turned flange bonded to the out turned flange of said first sleeve, an inner sleeve lining both said sleeves adjacent said out turned flanges, a cylinder member within said first sleeve, an annular seal between said cylinder member and said inlet member, said inner sleeve having a plurality of inwardly extending projections extending substantially into engagement with adjacent portions of said cylinder member for centering said cylinder member within said first sleeve, and a spring having one end bearing against said cylinder member and having its opposite end bearing against the in turned flange of said second sleeve.

References Cited by the Examiner

UNITED STATES PATENTS

| | | | |
|---|---|---|---|
| 2,304,404 | 12/1942 | Flanagan | 251—63 X |
| 2,329,001 | 9/1943 | Robinson | 251—36 |
| 2,366,596 | 1/1945 | Clifton | 137—491 |
| 2,890,714 | 6/1959 | Greenwood et al. | 137—491 |
| 3,040,771 | 6/1962 | Droitcour et al. | 137—489.3 |
| 3,133,555 | 5/1964 | Powell et al. | 137—489.5 |

M. CARY NELSON, *Primary Examiner.*

MARTIN P. SCHWADRON, *Examiner.*